United States Patent [19] [11] 3,905,343
Ryan [45] Sept. 16, 1975

[54] STRATIFIED CHARGE SYSTEM
[76] Inventor: John J. Ryan, 18 Ellwood St., Glen Cove, N.Y. 11542
[22] Filed: Sept. 21, 1973
[21] Appl. No.: 399,302

[52] U.S. Cl. ......... 123/75 B; 123/32 ST; 123/143 B; 123/191 S
[51] Int. Cl.² ......................................... F02B 19/10
[58] Field of Search ....... 123/191 SP, 191 S, 143 B, 123/32 C, 32 D, 32 ST, 32 SP, 32 SA, 32 K, 75 B

[56] References Cited
UNITED STATES PATENTS

| | | | |
|---|---|---|---|
| 1,181,122 | 5/1916 | Eastman | 123/143 B |
| 1,296,614 | 3/1919 | Blakely | 123/32 D |
| 2,032,986 | 3/1936 | Howell et al. | 123/32 ST X |
| 2,700,963 | 2/1955 | Crawford | 123/32 C |
| 3,066,661 | 12/1962 | May | 123/143 B |
| 3,066,662 | 12/1962 | May et al. | 123/143 B |
| 3,154,058 | 10/1964 | Warren | 123/32 ST |
| 3,270,722 | 9/1966 | Bernard | 123/32 ST |
| 3,406,667 | 10/1968 | Evans et al. | 123/32 St |
| 3,661,125 | 5/1972 | Stumpfig | 123/32 ST |

OTHER PUBLICATIONS
Sae Article Number 660094, "Project Stratofire," By Keith H. Rhodes, Automotive Engr. Congress, Detroit, Mich., Jan. 10–14, 1966.

Primary Examiner—Charles J. Myhre
Assistant Examiner—Tony Argenbright
Attorney, Agent, or Firm—Smythe & Moore

[57] ABSTRACT

A stratified charge emission control system for an internal combustion engine comprises a fuel and air metering unit mounted on a precombustion chamber which in turn is mounted in a spark plug hole of the cylinder head of the engine. The spark plug is mounted on the outer end of the precombustion chamber and the unit is provided with a mixing passage which is connected to a fuel source and a source of air. The unit provides the rich portion of the charge to the cylinder and the lean portion of the charge is introduced thereto from the carburetor. The unit also can be used in conjunction with a fuel injection engine.

2 Claims, 3 Drawing Figures

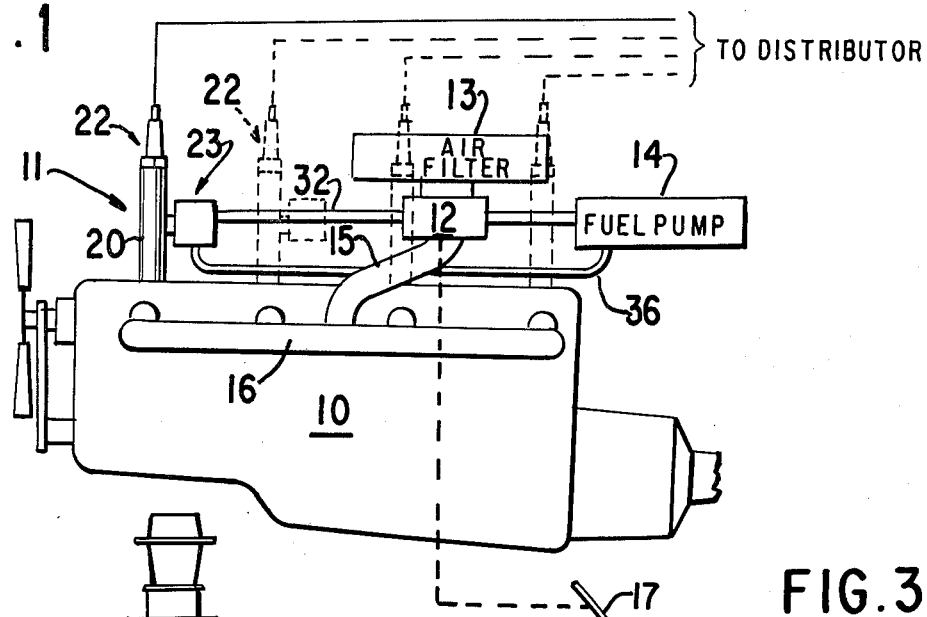
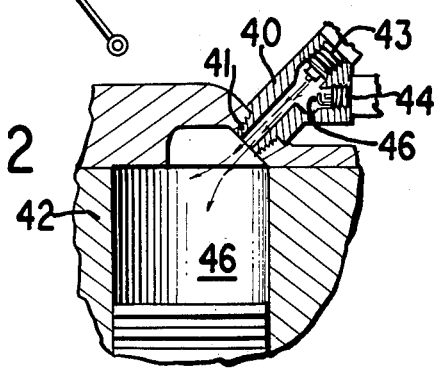
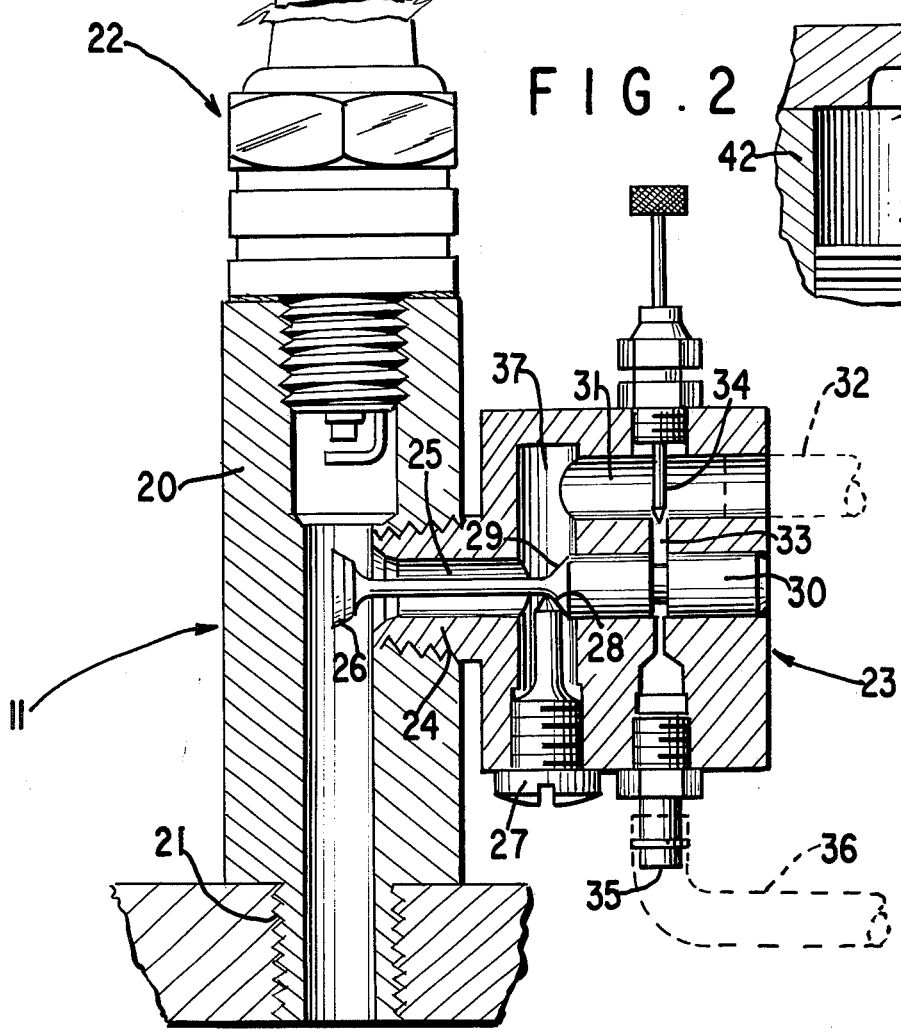

STRATIFIED CHARGE SYSTEM

The present invention relates to an emission control system for an internal combustion engine and, more particularly, to a stratified charge emission control system.

In the conventional internal combustion engine, all of the combustible gases in the cylinders of the engine are not burned. The remaining combustible gases are then emitted through the exhaust of the engine and constitute a significant quantity of hydrocarbons which are a major source of the air pollution found near all cities having a substantial automobile population. Various modifications of such engines have been proposed in an effort to bring about complete combustion of the gases in the cylinder or to otherwise control the quantity of hydrocarbons emitted through the exhaust.

Various devices and modifications of engines have been proposed in which a stratified charge would be introduced into the engine. A stratified charge would enable combustion to take place layer upon layer or in more than one phase. Such known stratified charge proposals have been generally unsatisfactory since they required alteration of major engine components, such as pistons, valves, cylinder heads and the like, for installation and the proper functioning. Further, some of these prior stratified charge systems require a fuel injection system embodying extremely accurate variable fuel injection system embodying extremely accurate variable fuel metering and a very short injection interval. The effects of these requirements are prohibitive initial cost and frequent expensive maintenance. Further disadvantages were that the proposed systems were adapted for only special engines and significant modifications were required before they could be employed, if at all, in other forms of internal combustion engines. Also, it was exceedingly difficult and sometimes impossible to convert existing engines to accomodate the previously proposed stratified charge system.

One of the objects of the present invention is to provide an improved stratified charge system for controlling exhaust emissions of an internal combustion engine.

Another object is to provide a stratified charge system which can be installed without alteration of major engine components so that existing internal combustion engines can be converted to stratified charge operation.

Still another object of the present invention is to provide a device which is simple in structure and economical to manufacture and in operation and which can be installed on existing internal combustion engines to provide stratified charge operation.

According to one aspect of the present invention, a device for reducing exhaust emission of internal combustion engines may comprise a tubular ignition or precombustion chamber adapted to be mounted in the spark plug hole of the cylinder head of an internal combustion engine. A spark plug is mounted on the outer end of the tubular chamber and a fuel and air-metering unit is mounted on the chamber to communicate therewith. The unit is provided with a mixing passage therein adapted for connection to a fuel source and a source of air.

The process according to the present invention may comprise mixing fuel and air in the precombustion chamber during the intake stroke of the piston to provide the rich portion of the charge to the cylinder. The lean portion of the charge is supplied to the cylinder through the regular intake manifold system of the engine during the intake stroke. The rich portion of the charge in the ignition chamber is ignited by the spark plug and in turn ignites the lean portion in the main combustion chamber.

Other objects, advantages and features of the present invention will be apparent from the accompanying description and drawings, which are merely exemplary.

In the drawings:

FIG. 1 is a schematic representation of an engine upon which the devices of the present invention are mounted;

FIG. 2 is a vertical sectional view of the device according to the present invention; and FIG. 3 is a fragmentary vertical sectional view of a modified form suitable for fuel injection engines.

Proceeding next to the drawings wherein like reference symbols indicate the same parts throughout the various views, a specific embodiment of the present invention will be described in detail.

As may be seen in FIG. 1, there is indicated generally at 10 an internal combustion engine, such as could be used in an automobile, upon which the device according to the present invention is mounted and indicated generally at 11. The engine is equipped with a carburetor 12 upon which is mounted an air filter 13. A fuel pump 14 is connected between a source of fuel and the intake of the carburetor. The carburetor has its outlet 15 connected to an intake manifold 16 of the engine. In the conventional manner, the carburetor is controlled by a foot-actuated accelerator pedal 17.

The device 11 according to the present invention is illustrated in greater detail in FIG. 2 and comprises a tubular ignition or precombustion chamber 20 whose lower end 21 is mounted in the spark plug hole of the cylinder head of the engine. The upper or outer end of the combustion chamber 20 has a spark plug 22 mounted thereon. A preset fuel and air metering unit indicated generally at 23 is mounted on the tubular chamber 20 so that the device essentially comprises the combustion chamber 20 and the metering unit 23.

Unit 23 has a socket extension 24 which is threaded into an opening formed in the wall of chamber 20 so that the interior of the unit communicates with the interior of the chamber through a passage 25. Passage 25 can be regulated between open and closed positions by a poppet valve 26 whose open position can be set by a stop screw 27 whose inner end 28 bears against a tapered portion 29 of the valve stem 30 of the poppet valve. The poppet valve is actuated and timed by the pressure and vacuum pulsations from the engine cylinder.

Also within the unit is a mixing passage 31 in which fuel and air are mixed. Fuel and air are mixed in passage 31 at a fixed ratio independently of the main carburetor.

Fuel is admitted to mixing passage 31 through a passage 33 controlled by a needle valve 34 and communicating with a fuel connection 35 which is connected at 36 to the fuel delivery line from the engine fuel pump 14. Within unit 23, a passage 37 connects mixing passage 31 with passage 25 communicating with the interior of the precombustion chamber. One such device 11 is required for each cylinder of the engine.

In the operation of the device 11, fuel and air mixtures are admitted to each cylinder from two sources during the intake stroke. The first source is the fuel and air metering unit and ignition chamber assembly. During the intake stroke, valve 26 opens and air is drawn through mixing passage 31 where fuel is added from 33 and the mixture is drawn into ignition chamber 20. During the compression stroke, valve 26 is closed to isolate the unit from the precombustion chamber and the fuel-air mixture in the chamber is entrapped and compressed by the reversed flow induced by compression of the charge in the cylinder and combustion chamber 20. The entrapped and compressed charge in chamber 20 is ignited by a spark plug 22 and the ignited charge fires into the main combustion chamber of the cylinder. The fuel metering adjustment needle 33 on each unit 23 is set to feed sufficient fuel to provide a mixture rich enough for spark ignition in the ignition chamber throughout the fuel feed range of the main carburetor from idle (leanest) through part load to full load.

The second source is the main carburetor. When the accelerator is released and the engine is idling, minimum fuel is added to the air entering the intake manifold and the air flow is not throttled. Upon actuation of the accelerator, additional fuel is mixed with the air entering the intake manifold and carried to each cylinder to provide the lean portion of the stratified charge in the cylinder. The rich portion of the charge is the mixture entrapped in the precombustion chamber.

The present device thus provides a mixture which is sufficiently rich to be ignited by the spark plug under all operating conditions and also provides more than the volume of air required for complete combustion in the main combustion chamber under all conditions of partial load operation of the engine.

In adapting the invention to existing internal combustion engines, the carburetor can have the throttle and choke butterfly plates removed and the idling fuel circuit blocked. The fuel jet metering system is arranged so as to be controlled by the accelerator linkage and shutoff fuel feed when the throttle is released. A source of variable vacuum controlled by engine speed and throttle position is used to replace the conventional manifold vacuum controlling spark timing, power brakes, automatic transmission, etc.

The device 11 of the subject invention can be readily installed and will function without disassembly or alteration of the major engine components, such as pistons, valves, and cylinder heads, and further does not require a fuel injection system.

The present invention permits stratified charge operation of an internal combustion engine but does not require costly modifications to pistons, valves, and cylinder heads, and does not require special spark plugs or fuel injection. The invention may be adapted to all spark ignition engines including rotary engines and crankcase charged two-cycle engines.

Due to the very minute fuel volume increments required for the ignition chamber charge in low displacement engines, such as in compact cars, motorcycles, recreational vehicles, etc., a simplified fuel injection system with preset fixed metering and non-critical injection interval may be desirable to produce smooth operation at idle and low speeds.

Referring now to FIG. 3, precombustion chamber 40 has lower end 41 insertable into the injection nozzle hole of the cylinder 42 of an engine. The injection nozzle 43 is connected to the injection fuel pump of the engine. Spark plug 44 is mounted on the chamber 40 in a manner similar to that described for FIGS. 1 and 2. Injection of fuel from nozzle 43 is timed to start at approximately 80 degrees before top dead center during the compression stroke for the cylinder involved, and the injector nozzle orifice location is such as to direct the fuel spray through the length of a tubular precombustion chamber 40 and into the main combustion chamber 45. The high velocity spray induces an outward flow of displaced air and fuel from the precombustion chamber to the main combustion chamber and results in a pressure differential between the remote end of the precombustion chamber and the main combustion chamber at the end of the injection interval. After injection, a reverse or inward flow into the precombustion chamber is induced by the pressure differential mentioned above and maintained by the increasing compression pressure during the remainder of the compression stroke. This reversing flow sequence results in entrapment of part of the injected fuel charge in the precombustion chamber and its compression therein to provide an ignitable mixture density at the spark electrodes 46 which are also located in the precombustion chamber which are fired at the required time. The entire precombustion chamber assembly is designed to be mounted in the existing spark plug mounting openings, and standard spark plugs are utilized as in the arrangement shown in FIGS. 1 and 2.

The present invention also provides reduced exhaust emissions, reduced crankcase emissions, substantial reduction in fuel consumption, elimination of engine knock, multi-fuel capability, and increases the service life of the engine. High octane or cetane rated fuels are not required for the proper operation of the present invention.

It should be apparent that various details of construction can be varied without departing from the spirit of the invention except as defined in the appended claims.

What is claimed is:

1. A device for reducing exhaust emission of internal combustion engines having cylinder means comprising a tubular ignition chamber having a first passage therein adapted to be mounted in a spark plug hole of a cylinder means of an internal combustion engine, said first passage being communicable with the interior of a cylinder means, a spark plug mounted on the outer end of said tubular chamber and in communication with said first passage, and fuel and air metering means mounted on said tubular chamber to communicate with said first passage, said means having a flow passage therein adapted for connection to a source of air and with said first passage, a freely slidable non-spring actuated poppet check valve in said flow passage for controlling flow of air to said first passage, said poppet valve being openable only by suction in said cylinder and closable only by compression in said cylinder, said poppt valve having a valve head cooperable with a valve seat connected to said first passage, a slidable valve stem having two ends, a shank smaller in cross-sectional area than said valve stem joined to one end of said stem with the other end of said shank joined to said valve head, the effective area of the ends of said stem being so related that only pressure exerted on the stem during the compression stroke will cause the valve to close the mixing passage to the cylinder and only the vacuum on the stem during the suction stroke will cause the valve to open to admit the air to pass to said first passage, the poppet valve being actuated and timed only by the pressure and vacuum pulsations of the engine cylinder.

2. A device for reducing engine exhaust emission of internal combustion engines having cylinder means comprising a tubular ignition chamber having a first passage therein adapted to be mounted in a spark plug hole of a cylinder means of an internal combustion engine, said first passage being communicable with the interior of a cylinder means, a spark plug mounted on the outer end of said tubular chamber and in communication with said first passage, a fuel and air metering unit mounted on said tubular chamber to communicate with said first passage, said unit having a mixing passage therein adapted for connection to a fuel source, to a source of air and with said first passage, a freely slidable poppet check valve in said mixing passage for controlling flow of air and fuel to said first passage, said poppet valve being openable by suction in said cylinder and closable by compression in said cylinder, said poppet valve having a valve element cooperable with a valve seat in said mixing passage, a slidable valve stem and a smaller shank joining said valve element and valve stem, the area of said valve element and valve stem being related so that the compression stroke will cause said valve to close the mixing passage, and a fuel metering aperture in said mixing passage, the opening of which is controlled by said valve stem.

* * * * *